(12) United States Patent
Katsaros

(10) Patent No.: US 9,441,673 B2
(45) Date of Patent: Sep. 13, 2016

(54) ROLLING-ELEMENT BEARING

(71) Applicant: Aktiebolaget SKF, Göteborg (SE)

(72) Inventor: Padelis Katsaros, Schweinfurt (DE)

(73) Assignee: AKTIEBOLAGET SKF, Gothenberg (SE)

( * ) Notice: Subject to any disclaimer, the term of this patent is extended or adjusted under 35 U.S.C. 154(b) by 251 days.

(21) Appl. No.: 14/297,966

(22) Filed: Jun. 6, 2014

(65) Prior Publication Data

US 2014/0363113 A1 Dec. 11, 2014

(30) Foreign Application Priority Data

Jun. 6, 2013 (DE) .................. 10 2013 210 522

(51) Int. Cl.
| | |
|---|---|
| F16C 33/66 | (2006.01) |
| F16C 19/38 | (2006.01) |
| F16C 33/78 | (2006.01) |
| F16C 19/28 | (2006.01) |
| F16C 33/60 | (2006.01) |

(52) U.S. Cl.
CPC ......... *F16C 33/6648* (2013.01); *F16C 19/386* (2013.01); *F16C 33/6655* (2013.01); *F16C 33/7876* (2013.01); *F16C 33/60* (2013.01); *F16C 2326/02* (2013.01)

(58) Field of Classification Search
CPC F16C 33/6648; F16C 33/6674; F16C 33/76; F16C 33/78; F16C 19/28; F16C 19/385
USPC ............... 384/462, 465, 467, 469, 477, 504, 384/544.586; 277/391, 393, 448, 404, 408
See application file for complete search history.

(56) References Cited

U.S. PATENT DOCUMENTS

| | | | | |
|---|---|---|---|---|
| 1,930,312 | A | * | 10/1933 | Greenhoe ...................... 384/469 |
| 2,000,581 | A | * | 5/1935 | Coffin, Jr. et al. ............ 384/469 |
| 3,759,592 | A | | 9/1973 | Carlson |
| 4,243,276 | A | | 1/1981 | Persson et al. |
| 4,534,871 | A | * | 8/1985 | Johnson ........................ 508/100 |
| 4,571,097 | A | * | 2/1986 | Lee et al. ....................... 384/469 |
| 4,601,592 | A | * | 7/1986 | Jatczak et al. ................ 384/564 |

(Continued)

FOREIGN PATENT DOCUMENTS

| | | |
|---|---|---|
| DE | 69408410 T2 | 9/1998 |
| DE | 10151263 A | 4/2003 |

(Continued)

*Primary Examiner* — Marcus Charles
(74) *Attorney, Agent, or Firm* — Bryan Peckjian; SKF USA Inc. Patent Dept.

(57) ABSTRACT

A rolling-element bearing includes a first rolling-element bearing ring configured to be mechanically connectable to a stationary component, a second rolling-element bearing ring configured to be mechanically connectable to a rotating component and at least one porous body disposed between the first rolling-element bearing ring and the second rolling-element bearing ring and configured to hold a lubricant. The at least one porous body is mechanically coupled to the second rolling-element bearing ring and configured such that during rotation of the second rolling-element bearing ring the at least one porous body substantially rotates with the second rolling-element bearing ring, and, due to this rotation, releases an amount of the lubricant. The at least one porous body is further configured to absorb at least a portion of the released amount lubricant when the second rolling-element bearing ring is stationary.

17 Claims, 1 Drawing Sheet

(56) References Cited

U.S. PATENT DOCUMENTS

| | | | |
|---|---|---|---|
| 5,356,227 A * | 10/1994 | Sibley et al. | 384/463 |
| 5,399,026 A | 3/1995 | Witte | |
| 5,529,401 A | 6/1996 | Gabelli et al. | |
| 6,116,785 A * | 9/2000 | Kondo et al. | 384/463 |
| 6,334,713 B1 * | 1/2002 | Chu | 384/464 |
| 7,789,569 B2 * | 9/2010 | Fukuda | 384/470 |
| 2007/0280572 A1 | 12/2007 | Coicaud | |
| 2010/0316317 A1 * | 12/2010 | Feldmeier | 384/469 |
| 2011/0255816 A1 * | 10/2011 | Foertschbeck | 384/469 |
| 2012/0328225 A1 | 12/2012 | Ito et al. | |

FOREIGN PATENT DOCUMENTS

| | | | | |
|---|---|---|---|---|
| DE | 202007000001 U1 | 4/2007 | | |
| DE | 202007000001 U1 | 5/2007 | | |
| DE | 102006033124 A1 * | 1/2008 | | F16C 33/78 |
| DE | 102007044014 A | 3/2009 | | |
| DE | 102007044127 A | 3/2009 | | |
| EP | 0090557 A2 * | 10/1983 | | F16C 19/36 |
| EP | 0654613 A | 5/1995 | | |
| EP | 1832766 A2 | 9/2007 | | |
| EP | 1956256 A | 8/2008 | | |
| EP | 2199632 B1 | 9/2013 | | |
| FR | 2914031 A | 9/2008 | | |
| GB | 478825 A | 1/1938 | | |
| JP | 2000120707 A | 4/2000 | | |
| JP | 2000120707 A | 10/2001 | | |
| JP | 2007292257 A * | 11/2007 | | |
| JP | 2008215418 A | 9/2008 | | |
| JP | 2008215419 A | 9/2008 | | |

* cited by examiner

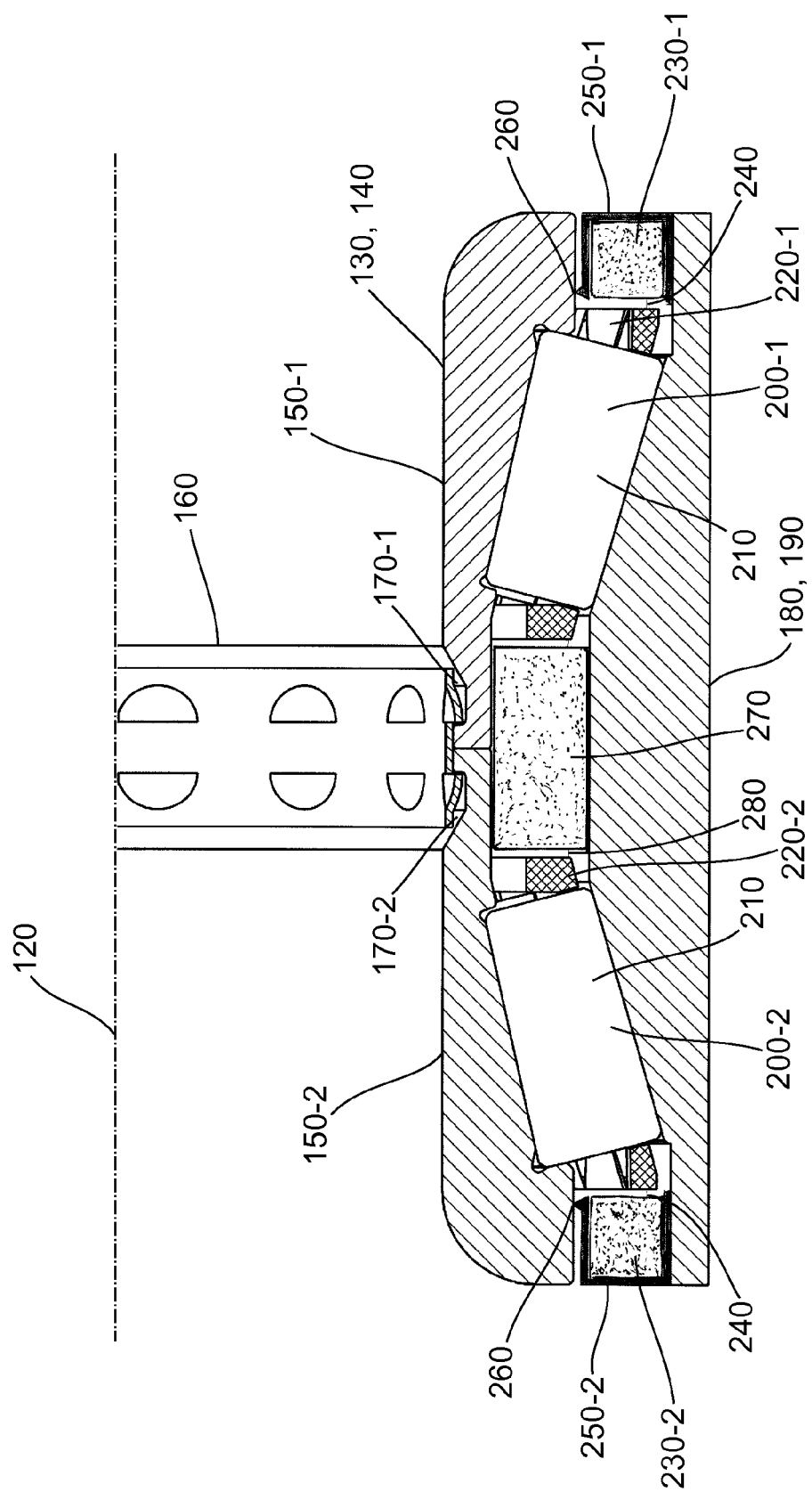

ROLLING-ELEMENT BEARING

CROSS-REFERENCE

This application claims priority to German patent application no. 10 2013 210 522.3 filed on Jun. 6, 2013, the contents of which are fully incorporated herein by reference.

TECHNOLOGICAL FIELD

Exemplary embodiments relate to a rolling-element bearing that can be used, for example, as a wheel bearing for an automobile, truck or other motor vehicle.

BACKGROUND

Rolling-element bearings are used in many areas of technology to guide and support two components that rotate relative to each other. One of the components is often immobile, fixed in space, or stationary relative to a machine with which it is used or connected. The component may be, for example, the housing of the machine or another equivalent or corresponding component. In the motor vehicle field, the component may be a transmission housing, an engine block, or an axle, shaft or other wheel support. Alternately, the rolling-element bearing can be a transmission bearing (a bearing for a transmission shaft), an engine bearing (a bearing that supports a shaft or other rotating part of an engine), or a wheel bearing. But similar challenges also arise in other fields of machine, factory, and vehicle engineering and rolling-element bearings are used in those fields as well.

In contrast to large bearings, such as are used, for example, in the wind power field, various lubricating concepts are often used in compact bearings. These bearings are often implemented as sealed bearings, bearings into which the required lubricant has been introduced during manufacturing or during assembly of the bearing. In this way lubrication can be provided for the entire service life of the bearing (for-life lubrication) or, alternatively, for a certain operating period, after which the lubricant must be changed during a servicing. Grease is often used as a lubricant in sealed bearings because grease can be more easily prevented from leaking from the rolling-element bearing than can lubricating oil.

Using grease as a lubricant is not always an optimal choice. Grease generally comprises an oil bound up or emulsified in a carrier such a soap. Under the influence of shear forces, the oil leaves the carrier and becomes available for lubrication. However, as these shear forces may only be applied to the portions of the grease near a moving surface, only a small part of the oil bound in the grease is used for the actual lubrication. The remainder of the oil typically remains passive and unused in regions of the grease which are not located in the immediate vicinity of the work surfaces or contact surfaces. A not-insignificant proportion of the grease used in the rolling-element bearing thus may not contribute to lubrication, but nonetheless its presence increases the mass of a rolling-element bearing.

Liquid lubricants, on the other hand, mix and coat surfaces better than grease due to their lower viscosities and are used more efficiently when introduced into a rolling-element bearing. Because of their lower viscosity, however, liquid lubricants require a more expensive or complex seal to prevent them from, leaking out of the rolling-element bearing.

SUMMARY

There is therefore a need to provide a rolling-element bearing that can use a liquid lubricant without the need for expensive liquid-impermeable seals. This problem is addressed by embodiments of the present disclosure.

A rolling-element bearing according to an exemplary embodiment comprises a first rolling-element bearing ring that is configured to be mechanically connectable to a stationary component, a second rolling-element bearing ring configured to be mechanically connectable to a rotating component, and at least one porous body disposed between the first and the second rolling-element bearing ring and configured to receive/accommodate/hold a lubricant. The at least one porous body is thus mechanically coupled to the second rolling-element bearing ring so that the at least one porous body substantially rotates with the second rolling-element bearing ring and releases a quantity of the lubricant contained therein in response to the rotation. In this case, the at least one porous body is typically embodied with open- or semi-open-porosity (open- or semi-open pores) in order to make possible the release of the lubricant.

A rolling-element bearing according to an exemplary embodiment is thus based on the recognition that a comparatively simple seal can be used in connection with a liquid lubricant if at least one porous body is provided between the two rolling-element bearing rings of the rolling-element bearing, which porous body is mechanically coupled to the rotating rolling-element bearing ring so that a lubricant absorbed/retained/accommodated in the porous body can be released by the rotation, for example by a centrifugal force, thereof. In this way it is possible to use liquid lubricants without the need for expensive, liquid-impermeable seals. The porous body thus allows a rolling-element bearing according to an exemplary embodiment to use a liquid lubricant, for example. In an exemplary embodiment the porous body can thus for example be impregnated/soaked/saturated with the lubricant.

In a rolling-element bearing according to an exemplary embodiment, the at least one porous body can further be formed to absorb/receive/retain/hold collected lubricant when the second rolling-element bearing ring is stationary/stopped/idling. In this way it can be possible to optionally further reduce the sealing demands on the seal, since when the rolling-element bearing is stationary, lubricant that collects at the seal is reabsorbed (taken up again) into the at least one porous body. The lubricant is thus no longer (or at least not completely) in the form of a liquid between the rolling-element bearing rings, and it can therefore no longer escape or leak from the rolling-element bearing through a seal. The at least one porous body is also designed to have open- or semi-open pores, in order to also make possible an absorbing/receiving/retention/accommodation of the collected lubricant. In this way the porous body or porous bodies can absorb/receive or soak up the collected lubricant by capillary forces or other forces acting thereon.

In a rolling-element bearing according to an exemplary embodiment, a maximum uptake/retention/accommodation amount of all porous bodies of the rolling element bearing can exceed the total lubricant filling capacity of the rolling-element bearing. In this way it can be possible to completely, nearly completely, or largely absorb/take up/retain all the lubricant into the porous bodies when the rolling-element bearing is stationary. In this case the total amount of lubricant contained or enclosed in the rolling-element bearing typically represents the total filling capacity of the rolling-element bearing.

In a rolling-element bearing according to an exemplary embodiment, the at least one porous body can be indirectly or directly mechanically coupled to the second rolling-element bearing ring using a friction-fit connection, for example a press-fit, using an interference-fit connection, for example by a dovetail connection, or using a materially-bonded connection, for example by an adhering or a welding. It can thus be possible in different exemplary embodiments, or even in exemplary embodiments having more than one porous body, to couple the porous body or the porous bodies to the second bearing ring using different connection techniques. In this case the mechanical coupling therewith can be effected directly, i.e. using an appropriate friction-fit, interference-fit, or materially-bonded connection; however it can also be effected indirectly, i.e. using a further component. In such a case the porous body or bodies can in turn be mechanically connected or coupled to the respective further component via a friction-fit, interference-fit, and/or materially-bonded connection.

As used herein, a "friction-fit" connection results from static friction, a "materially-bonded" connection results from molecular or atomic interactions and forces, and an "interference-fit" connection results from a geometric connection of the respective connecting partners. The exact design of the connection technique implemented here can depend on a variety of parameters, including among others the choice of material for the rolling-element bearing rings and for the porous body or bodies, for the optionally implemented seal, for the respective lubricant and/or other components, to some degree on the rolling elements and on an optionally-implemented cage.

In a rolling-element bearing according to an exemplary embodiment, in which the lubricant is an oil, the at least one porous body can be manufactured from a material that is oil-resistant and temperature resistant up to at least 75° C., which material may comprise a body of, for example, polyamide, polycarbonate, polystyrene, polyurethane or styrene-acrylonitrile copolymer, any of which may be foamed in a conventional manner to produce an open cell or partially open cell foam or sponge of the respective material. In this way it is possible to use porous bodies which are relatively simple to manufacture but can be adjusted/adapted to meet or satisfy the operating conditions/requirements. In other exemplary embodiments it can be advantageous to also optionally use high-temperature-resistant materials which are, for example, temperature-resistant up to at least 90° C., up to at least 100° C., up to at least 110° C., or up to at least 120° C. Last but not least, the intended location of use and the operating conditions prevailing therein are in turn also relevant.

In a rolling-element bearing according to an exemplary embodiment the lubricant can be a liquid. The rolling-element bearing can include a seal which is liquid-permeable when the second rolling-element bearing ring is stationary with respect to the first rolling-element bearing ring. In this way it is possible to simplify the sealing technology used as compared to a conventional sealing technology required to retain a liquid lubricant when the second rolling-element bearing ring is stationary. The seal can thus, for example, be a radial-shaft seal or a gap seal.

In such a rolling-element bearing according to an exemplary embodiment, at least one of the at least one porous body can be adjacent to the seal, be a part of the seal, or the seal can comprise the at least one of the at least one porous body. In this way it can be possible to simplify an assembly or a servicing of the rolling-element bearing because the at least one porous body is embodied as part of the seal or comprised therein, so that it can be exchanged or installed together with the seal. The arrangement of the at least one porous body on the seal can additionally or alternatively reduce the sealing demands on the seal, since the at least one porous body makes possible an absorbing of the lubricant directly in the region wherein the rolling-element bearing could possibly otherwise allow the lubricant to escape through the seal. In other words the at least one porous body can optionally support or improve the sealing ability of the seal at this location.

In a rolling-element bearing according to an exemplary embodiment the rolling-element bearing can be embodied as a multi-row rolling-element bearing with a first and a second row of rolling elements. In this environment, the porous body can be disposed between the first and the second row of rolling elements. Alternatively, if the rolling-element bearing already includes a porous body which is adjacent to the seal, is a part of the seal, or comprises the seal of the porous body, an additional porous body can be disposed between the first and the second row of rolling elements. In this way it can be possible to use a space between the two rows of rolling elements for receiving/retaining/accommodating the lubricant. In this way a free bearing volume (the amount of empty space within the bearing) can also optionally be reduced, which free bearing volume is possibly greater especially in multi-row rolling-element bearings than in single-row rolling-element bearings.

A rolling-element bearing according to an exemplary embodiment can be a wheel bearing for a motor vehicle, for example an automobile or a truck. Exemplary embodiments of rolling-element bearings can thus, for example, also implement the use of a liquid lubricant in high-load environments, such as the chassis of a motor vehicle.

In a rolling-element bearing according to an exemplary embodiment, the porous body, or, if the rolling-element bearing includes more than one porous body, the porous bodies, reduces a free bearing volume to at most 25% of a free comparison bearing volume which corresponds to the free bearing volume of the rolling-element bearing without the at least one porous body. In other words, the porous body or bodies may fill up to 75% of the space that would have existed in the bearing if the porous body or bodies were not present. The presence of one or more porous bodies reduces the free bearing volume and thus the amount of air or gas enclosed in the bearing. Thus, pressure changes due to temperature fluctuations or other factors influencing the pressure in the interior of the rolling-element bearing can be reduced so that the load on the seals due to inflowing or outflowing gas on the optionally implemented seal can be reduced. In this way due to mechanical influences of the seals it may be possible to reduce wear of the seal and/or to reduce the ingress of moisture, water, or other contaminants into the bearing.

In exemplary embodiments of a rolling-element bearing, the at least one porous body can be substantially not compressible, i.e. substantially incompressible. In this way the mechanical stability of the porous body can optionally be improved so that it is usable, for example, in the context of the seal or of another structure or function. However, in other exemplary embodiments it can optionally be advisable to provide a compressible porous body, in order, for example, to make it possible to compensate for linear expansion and/or displacements. As used herein, the phrase "substantially incompressible" refers a porous body the shape of which does not noticeably change under use conditions.

BRIEF DESCRIPTION OF THE DRAWINGS

Exemplary embodiments of the present disclosure are explained in more detail and described with reference to the accompanying FIGURE.

FIG. 1 shows a cross-sectional view through a rolling-element bearing according to an exemplary embodiment.

DETAILED DESCRIPTION

In the context of the present description, summarizing reference numbers are used for objects, structures, and other components if the relevant component is described with respect to itself or a plurality of corresponding components within an exemplary embodiment or within a plurality of exemplary embodiments. Passages of the description which refer to a component are therefore transferable to other components in other exemplary embodiments, insofar as this is not explicitly excluded or this follows from the context. If individual components are referred to, individual reference numbers are used which are based on the corresponding summarizing reference numbers. In the following description of embodiments, like reference numbers refer to like or comparable components.

Components which occur multiple times in an exemplary embodiment or in different exemplary embodiments can thereby be embodied or implemented identically and/or differently with respect to some of their technical parameters. It is thus possible that a plurality of entities can be implemented identically within an exemplary embodiment with respect to one parameter, but differently with respect to another parameter.

As has already been explained, rolling-element bearings are used in many fields of technology. Sealed bearing units are also used in many of these fields, that is, bearing units into which a lubricant is introduced during manufacture. In order to prevent the lubricant from escaping or leaking out of the bearing unit, the corresponding rolling-element bearings typically include an appropriate seal.

Grease is often used as a lubricant in conventional sealed bearing units, and the grease is retained in the interior of the bearing unit and prevented from leaking out by the above-mentioned seal.

Grease is often chosen as the lubricant instead of oil because it can be more easily sealed against escape or leakage. Even with a grease lubricant, however, it is the oil bound in the grease that is often responsible for the lubrication. Under pressure and flexing and/or the application of shear force, this oil is released from the grease, and it then lubricates the contact surfaces, i.e. the raceways of the rolling-element bearing rings and the corresponding rolling surfaces of the rolling elements.

Although there is a relatively large amount of grease in a bearing unit or a rolling-element bearing, only a small amount of the grease is used for the actual lubrication. This is the portion of the total volume of grease that is located near the contact surfaces or contact zones. The remainder of the volume of grease remains passive and unused in regions which are distant from the loaded or working contact surfaces and which are not subjected to forces that tend to release oil from the grease.

In such a conventional rolling-element bearing it is necessary to replace the grease or lubricant when the respective relatively small amount of grease in the region of the contact surfaces has "bled out," that is, when all its oil has been released onto the contact surfaces. Grease is unlikely to reabsorb oil which has been released from the grease.

FIG. 1 shows a cross-sectional view of a rolling-element bearing 100 according to an exemplary embodiment in which the rolling-element bearing is more specifically a wheel bearing 110 of a motor vehicle, for example of an automobile or a truck. The term "bearing unit" is also used synonymously for such a rolling-element bearing. More specifically, FIG. 1 shows a lower half of the rolling-element bearing 100 relative to a line of symmetry 120 that extends along an axial direction through the rolling-element bearing 100.

A first rolling-element bearing ring 130 extends perpendicular to the axial direction out of the plane of the drawing shown in FIG. 1. The first rolling-element bearing 130 is configured to be mechanically connectable to a stationary component. More specifically, the exemplary embodiment of a rolling-element bearing 100 shown in FIG. 1 is a two-part inner ring 140 comprising two partial inner rings 150-1 and 150-2. The two partial inner rings 150 are held together by a clamping sleeve 160 which engages them via symmetrically mounted and configured retaining structures 170-1 and 170-2 and thus connects the two partial inner rings 150 to each other. Openings, recesses, depressions, grooves, bores, or other mechanical elements can, for example, be used as retaining structures 170 which make possible a mutual engagement of the two partial inner rings 150.

The rolling-element bearing 100 or the wheel bearing 110 further comprises a second rolling-element bearing ring 180 which is configured to be mechanically connectable to a rotating component. Since the rolling-element bearing 100 shown in FIG. 1 is a wheel bearing 110, the second rolling-element bearing 180 is embodied as a common outer ring 190. The outer ring 190 is configured to be mechanically coupled to a wheel support so that the outer ring 190 rotates relative to the rest of the vehicle. In contrast thereto the inner ring 140 is configured to attach to the non-rotating or not-turning parts of the vehicle chassis/suspension. The inner ring 140 is thus stationary.

In the exemplary embodiment shown in FIG. 1, two rows 200-1, 200-2 of rolling elements 210 are disposed between the inner ring 140 and the outer ring 190, which rolling elements 210 are conical or truncated conical rolling elements 210. The rolling elements 210 are each retained in a spaced manner by and guided by a cage 220-1 or 220-2.

As is shown in FIG. 1, the rolling-element bearing 110 further includes a porous body 230-1 which is disposed between the first rolling-element bearing ring 130 and the second rolling-element bearing ring 180 and disposed and formed such that it is able to receive (absorb or take in or fill with) a lubricant. An example of a lubricant level 240 is schematically shown in FIG. 1, which lubricant level 240 represents a state of the level of the lubricant following a stopping of the outer ring 190 or of the second rolling-element bearing ring 180.

In this embodiment, the porous body is indirectly mechanically coupled to the second rolling-element bearing ring 180, i.e. the outer ring 190, via a seal 250-1 such that during a rotating of the second rolling-element bearing ring 180 the porous body 230-1 substantially rotates therewith. More specifically, the porous body 230-1 is disposed in the seal 250-1. In this way, as the second rolling-element bearing ring rotates, a centrifugal force acts on the porous body 230-1 and the lubricant absorbed/retained/accommodated therein, and this centrifugal force causes the lubricant or some portion thereof to be released from the porous body. During the rotating of the rolling-element bearing 100 or of the wheel bearing 110 the lubricant is then distributed in the region of the rolling-element bearing 100 such that it comes in contact to the raceways of the first or second rolling-element bearing ring 130, 180 and the associated rolling elements and lubricates them.

If the rotation of the wheel is stopped, i.e. the rotation of the second rolling-element bearing ring 180 with respect to the first rolling-element bearing ring 130 is inhibited such that the second rolling-element bearing ring 180 is significantly slowed or comes to a stop, the level of lubricant indicated by the depicted lubricant level 240 results. Since the porous body 230-1 is further formed such that when the second rolling-element bearing ring 180 is stationary or its rotational speed is reduced the porous body 230-1 can absorb receive/take in collected lubricant (lubricant that collects at the seal), the lubricant is absorbed/taken up or soaked up in the porous body 230-1, for example due to capillary effects. In this way in the case of a liquid lubricant the liquid lubricant is at least partially absorbed from the free bearing volume into the porous body 230-1. Here the free bearing volume (sometimes referred to as the "lubricating space") is the interior volume a fully assembled rolling-element bearing 100 that could be filled with lubricant when an uptake capacity of the porous body 230-1 for the lubricant is not taken into account.

In this way even if a liquid lubricant is used, a seal can be used for the seal 250-1 which can be liquid-permeable when the second rolling-element bearing ring 180 is stationary with respect to the first rolling-element bearing ring 130. The seal can thus, for example, be a radial-shaft seal or a gap seal. The presence of the porous body 230-1 thus allows a liquid permeable seal to be used with a liquid presence because the porous body 230-1 helps prevent the liquid lubricant from leaking out when the second rolling-element bearing ring 180 is stationary. That is, without the at least one porous body, the seal would be liquid permeable but the seal and at least one porous body together substantially prevent liquid from leaking out of the bearing unit.

FIG. 1 shows an exemplary embodiment of a rolling-element bearing 100 in which the seal 250-1 is embodied as a contact seal. The seal 250-1 has a sealing lip 260 which is in direct contact with the first rolling-element bearing ring 130 or the partial inner ring 150-1. The seal 250-1 is mechanically connected to the second rolling-element bearing ring 180 such that during a movement or rotation of the second rolling-element bearing ring 180 the seal 250-1 rotates therewith. Since the porous body 230-1 is mechanically connected to or attached to the seal 250-1, the porous body 230-1 also rotates therewith when the second rolling-element bearing ring 180 rotates. The porous body 230-1 is thus indirectly connected to the second rolling-element bearing ring 180, i.e. the outer ring 190, via the seal 250-1.

The rolling-element bearing 100 further includes a further porous body 270 which is disposed between the two rows 200-1, 200-2 of rolling elements 210. In other words, the further porous body 270 is disposed precisely in a region where the two partial inner rings 150-1 and 150-2 contact each other. The further porous body 270 is also mechanically coupled to the second rolling-element bearing ring 180, i.e. to the outer ring 190 in FIG. 1, and attached thereto. In this way the lubricant absorbed in the further porous body 270 is also pumped out of (released from) the further porous body 270 by centrifugal forces during rotation of the second rolling-element bearing ring 180 and that lubricant also becomes available to the rolling-element bearing rings 130, 180 and the rolling elements 210.

In addition, the rolling-element bearing 100 in FIG. 1 further includes a second porous body 230-2 which together with the corresponding second seal 250-2 is disposed and formed mirror-symmetric to the porous body 230-1 and the corresponding seal 250-1.

A lubricant level 280 is also drawn schematically in the region of the second porous body 270, which level can occur at least for a short time, for example when the second rolling-element bearing ring 180 is stationary with respect to the first rolling-element bearing ring 130, before the corresponding further porous body 270 absorbs/takes in the lubricant. Only for the sake of completeness, it is appropriate to note at this point that the lubricant levels 240, 280 drawn in FIG. 1 are only to be understood as pictorial. Thus in concrete exemplary embodiments different lubricant levels can occur when the rolling-element bearing ring 180 is stationary, depending on the lubricant used, duration of operation, and other manufacturing-, age-, and operation-dependent parameters. In this case the lubricant levels 240, 280 are relative to the underside with respect to gravity of the corresponding rolling-element bearing 100. Other lubricant levels can thus be present at other points along the circumference of the corresponding rolling-element bearing 100.

As the description has shown above, the porous bodies 230, 270 are formed to absorb lubricant and release it again due to centrifugal forces, or other forces acting on the lubricant, in the case of a rotation of the second rolling-element bearing ring. For this reason it can be advisable to form the porous bodies 230, 270 to have open- or at least semi-open porosity (pores) in order to absorb as much lubricant as possible in the respective porous bodies. In exemplary embodiments it can thus be advisable to design a maximum uptake amount of all porous bodies 230, 270 of the rolling-element bearing 110 such that the maximum intake amount exceeds a total filling capacity of lubricant in the rolling-element bearing 100. The total filling capacity of lubricant of the bearing is in this case the entire amount of lubricant contained or enclosed in the rolling-element bearing 100. In this way the seal effect of the seal 250 can optionally be augmented such that in the case of a liquid lubricant even a seal 250 which is liquid-permeable when the rolling-element bearing 100 is stopped can be used. Such liquid-permeable seals are often significantly less expensive to produce and manufacture than comparable liquid-impermeable seals, which are advisable in conventional rolling-element bearings using conventional oil lubrication.

The porous bodies 230, 270, which can also be referred to as "sponge-like," can be indirectly or directly mechanically coupled to the second rolling-element bearing ring 180 using a friction-fit, interference-fit, or materially bonded connection. In the case of a friction-fit connection, a corresponding porous body 230, 270 or, for example, the associated seal 250 can be pressed into the second rolling-element bearing ring 180 (in the case of an outer ring 190) or, in another exemplary embodiment, pressed onto the second rolling-element bearing ring 180 in the case of an inner ring. In such a case there is therefore a press-fit. The connection of the porous body or bodies 230, 270 can also be effected by an interference-fit connection, i.e. for example a dovetail connection or a projection/recess. A materially-bonded connection, for example an adhering or a welding, can also be used for mechanical coupling of the respective components. In this way depending on the materials used, operating conditions, and other parameters, one connecting technique may be more suitable than another.

If the lubricant is an oil, the porous bodies 230, 270 can, for example, be manufactured from a material which is oil-resistant and temperature-resistant up to at least 75° C., such as for example a body of polyamide, polycarbonate, polystyrene, polyurethane and styrene-acrylonitrile copolymer, any of which can be formed into an open or partially open-celled foam. In this way exemplary embodiments of a rolling-element bearing 100 can also be used in a broad spectrum of applications. Of course other exemplary embodiments can also have a higher temperature resistance, for example up to at least 90° C., up to at least 100° C., up to at least 110° C., or up to at least 120° C. Depending on the specific temperature resistance required, certain materials may be more suitable in this case than other materials. In addition to the above-mentioned plastics, in principle other materials can optionally be used that are capable of absorbing (taking up) oil as discussed above.

The material of the porous body or bodies 230, 270 or the corresponding porous bodies themselves can in this case be manufactured from a non-compressible material or have a corresponding structure. However, there can certainly be application areas or exemplary embodiments wherein an appropriate compressibility is useful and can thus be advisable. Such a case can exist, for example, if due to the operating conditions the porous body or bodies can possibly be compressed or pressed.

During manufacture or during a servicing, a rolling-element bearing 100 according to an exemplary embodiment can be provided with one or more porous bodies 230, 270 which were previously impregnated/soaked/filled with the lubricant. This avoids the need for a separate filling step for providing lubricant to the rolling-element bearing 100, and this, in turn, can potentially lead to a simplification of manufacturing and/or of servicing operations.

Although exemplary embodiments have been described above largely in the context of liquid lubricants, i.e., for example, oils, synthetic oils, or mineral oils, of course other liquid lubricants as such can also be used, for example suspensions. In principle, however, greases and other higher-viscosity lubricants can also be used. The terms "lubricant" and "lubricating means" can thus be used synonymously in the context of the present description.

Further exemplary embodiments of a rolling-element bearing 100 can differ from that shown in FIG. 1 in a variety of ways. Exemplary embodiments of a rolling-element bearing 100 are fixed, as is shown in FIG. 1. Instead of the symmetric arrangement of the porous bodies 230-1 and 230-2 and the associated seals 250-1 and 250-2, different designs of seals 250 and/or porous bodies 230 can be used. It is also by no means necessary to implement a second porous body 230-2 and/or a second seal 250-2. Thus in other exemplary embodiments the second porous body 230-2 and/or the second seal 250-2 can also be omitted.

In other exemplary embodiments the further porous body 270 can also optionally not be used. In other exemplary embodiments it is in turn also possible that this further porous body 270 is used instead of the porous bodies 230.

Rolling-element bearings 100 according to an exemplary embodiment are likewise not limited to the form shown in FIG. 1 of a double row tapered roller bearing. Thus exemplary embodiments of a rolling-element bearing 100 can also be implemented with other rolling-element geometries, for example cylindrical, needle-shaped, ball-shaped, or barrel-shaped rolling elements. The number of rows 200 of rolling elements 210 can also differ in other exemplary embodiments. Thus for example single row rolling-element bearings 100 can also be implemented according to an exemplary embodiment. The same also applies for rolling-element bearings having more than two rows.

Exemplary embodiments are also not limited, with respect to the exact embodiment of the rolling-element bearing geometries, to the rolling-element bearing 100 shown in FIG. 1. Thus in principle all rolling-element bearings, for example deep groove ball bearings, angular contact ball bearings, four-point contact ball bearings, shoulder ball bearings, self-aligning ball bearings, cylindrical roller bearings, needle roller bearings, as well as barrel roller bearings and spherical roller bearings can be implemented according to an exemplary embodiment.

In an exemplary embodiment of a rolling-element bearing 100, a sponge-type material body (porous body 230, 270) can be attached on or in the rotating components, i.e. the second rolling-element bearing 180, which is optionally impregnated/soaked with a lubricant, i.e. for example a lubricating oil. In this case the porous body or bodies 230, 270 can be formed such that they are in contact with or lightly touch the stationary components, i.e. the first rolling-element bearing ring 130. In other exemplary embodiments a spacing can be provided between the porous body 230, 270, and the first rolling-element bearing 130 which spacing is dimensioned such that the porous body 230, 270 is almost in contact with the first rolling-element bearing 130, i.e. comes very close thereto. Depending on the exemplary embodiment a spacing, for example, of less than 5 mm, of less than 2 mm, or of less than 1 mm can be used.

As explained above, the object of the porous body or bodies 230, 270 is to absorb/draw in the collected lubricant due to the porous structure of the porous body or bodies 230, 270 when the rolling-element bearing 100 is stopped. In this way the function and optionally also the structure of the respective porous body 230, 270 somewhat resembles a sugar cube or a cube made of sand. Depending on the specific design of an exemplary embodiment, an object of the porous body 230, 270 can further be to again release, i.e. spin-off, under the influence of the centrifugal force during a rotating of the first rolling-element bearing ring 130 the previously collected lubricating oil or even the lubricating oil absorbed in the porous body. In a rolling-element bearing 100 according to an exemplary embodiment, a liquid lubricant can optionally be used, without however resorting to expensive, liquid-impermeable seals.

Due to the sponge-type or porous body 230, 270 it can thus optionally be ensured that lubricant (e.g. oil) is only released during rotation and thus only then "freely" circulates when it is needed during the rotation. The seals 250 thus optionally do not need to seal the rolling-element bearing 100 against an escape of the "stationary" oil, that is, against the escape of oil when the rolling-element bearing is stationary. The rolling-element bearing 100 can thus be sealed in such a manner as if it were grease-lubricated. Since the porous body or bodies 230, 270 "absorb" or take up the lubricant during stoppage or at very low rotational speeds, the porous bodies and liquid lubricant in a way simulate a hypothetical grease that can be regenerated; that is the disclosure performs in some manners like a bearing unit that contains a grease that can reabsorb oil. However, a porous, sponge-type oil storage for a sealed bearing unit can not only improve the lubrication of such a bearing unit, but can also make it easier to compensate for or manage pressure fluctuations in the interior, wherein the pressure fluctuations can be caused by temperature-induced changes of the air volume or of the air density. With conventional bearing units a more-or-less large quantity of air is located in the bearing unit interior, which air expands when the bearing unit is heated. This expansion generates an overpressure which, depending on the seal design, either increases the pressure on the sealing lip and thus the friction and the wear, or the sealing lip lifts away from the component to be sealed and the seal thus opens. The air can escape from the interior of the bearing unit due to this opening of the seal.

If in a conventional bearing unit the air in the interior thereof is cooled again, it can result that the sealing lip is pressed against its opposing surface, i.e. the sealing surface. As a result, friction and wear can again increase. During the time the seal is open, i.e. when the air is escaping from the conventional bearing unit, there is the further risk that the lubricant will be released to the environment. On the other hand, if external air in turn flows into the bearing unit when the air is cooled, moisture and/or water and/or other contaminants can penetrate into the bearing unit.

An exemplary embodiment of a rolling-element bearing 100 can optionally also mitigate these risks or counteract these problems because the porous body or bodies 230, 270 reduce the free bearing space in the interior of the rolling-element bearing 100 as compared to a free comparison bearing volume (a volume of air in a roller-element bearing without a porous body or bodies). Due to the reduction of the free bearing volume, which is also referred to as "bearing free space," compared to a conventional rolling-element bearing a smaller amount of air is available to expand in the interior of the rolling-element bearing 100. The problem of the over or under pressure in the rolling-element bearing 100 resulting from temperature fluctuations or other operating conditions can thus optionally be solved, or at least mitigated or reduced. The load on the sealing lip or sealing lips 260 can also thus be correspondingly reduced and the associated over or under pressure reduced.

The features disclosed in the above description, the claims, and the drawings can be meaningful for the realization of exemplary embodiments in their different designs, both individually and in any combination, and—insofar as nothing different results from the description—can be combined with one another in any way.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved lubrication for rolling-element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Rolling-element bearing
110 Wheel bearing
120 Line of symmetry
130 First rolling-element bearing ring
140 Inner ring
150 Partial inner ring
160 Clamping sleeve
170 Retaining structure
180 Second rolling-element bearing ring
190 Outer ring
200 Row of rolling elements
210 Rolling elements
220 Cage
230 Porous body
240 Lubricant level
250 Seal
260 Sealing lip
270 Further porous body
280 Lubricant level

What is claimed is:

1. A rolling-element bearing comprising:
a first rolling-element bearing ring configured to be mechanically connectable to a stationary component;
a second rolling-element bearing ring configured to be mechanically connectable to a rotating component; and
at least one porous body disposed between the first rolling-element bearing ring and the second rolling-element bearing ring and configured to hold a lubricant,
wherein the at least one porous body is mechanically coupled to the second rolling-element bearing ring and configured such that during rotation of the second rolling-element bearing ring the at least one porous body substantially rotates with the second rolling-element bearing ring, and, due to this rotation, releases an amount of the lubricant,
wherein the at least one porous body is further configured to absorb at least a portion of the released amount lubricant when the second rolling-element bearing ring is stationary, and
wherein the lubricant is a liquid and wherein the rolling-element bearing includes a seal which is liquid-permeable when the second rolling-element bearing ring is stationary with respect to the first rolling-element bearing ring.

2. The rolling-element bearing according to claim 1, wherein a maximum intake amount of the at least one porous body exceeds a total lubricant filling capacity of the rolling-element bearing.

3. The rolling-element bearing according to claim 1, wherein the at least one porous body is indirectly or directly mechanically coupled to the second rolling-element bearing ring by a friction-fit connection, by an interference-fit connection, or by a materially-bonded connection.

4. The rolling-element bearing according to claim 1, wherein the lubricant is an oil and the at least one porous body comprises an oil-resistant material resistant to temperatures up to at least 75° C.

5. The rolling-element bearing according to claim 1, wherein at least one of the at least one porous body is adjacent to the seal, or is a part of the seal, or the seal comprises the at least one of the at least one porous body.

6. The rolling-element bearing according to claim 1, wherein the rolling-element bearing includes a first row of rolling elements and a second row of rolling elements, and wherein the at least one porous body is disposed between the first row of rolling elements and the second row of rolling elements.

7. A motor vehicle wheel bearing comprising the rolling-element bearing according to claim 1.

8. The rolling-element bearing according to claim 1, wherein the at least one porous body is indirectly or directly mechanically coupled to the second rolling-element bearing ring by a press-fit or by a dovetail connection, or by an adhering or by a welding.

9. The rolling-element bearing according to claim 1, wherein the lubricant is an oil and the at least one porous body comprises polyamide, polycarbonate, polystyrene, polyurethane or styrene-acrylonitrile copolymer.

10. The rolling-element bearing according to claim 1, including a lubricating space between the first rolling-element bearing ring and the second rolling-element bearing ring, wherein the at least one porous body is configured to absorb lubricant from the lubricating space and release the absorbed lubricant into the lubricating space.

11. The rolling-element bearing according to claim 10, wherein the lubricant is an oil, wherein a liquid retaining capacity of the at least one porous body exceeds a volume of the lubricating space, wherein the at least one porous body is indirectly or directly mechanically coupled to the second rolling-element bearing ring by a friction-fit connection, by an interference-fit connection, or by a materially-bonded connection, wherein the at least one porous body comprises polyamide, polycarbonate, polystyrene, polyurethane or styrene-acrylonitrile copolymer, wherein the rolling-element bearing includes a seal which is liquid-permeable when the second rolling-element bearing ring is stationary with respect to the first rolling-element bearing ring and wherein at least one of the at least one porous body is adjacent to the seal, or is a part of the seal.

12. A rolling-element bearing comprising:
a first rolling-element bearing ring configured to be mechanically connectable to a stationary component;
a second rolling-element bearing ring configured to be mechanically connectable to a rotating component; and
at least one porous body disposed between the first rolling-element bearing ring and the second rolling-element bearing ring and configured to hold a lubricant,
wherein the at least one porous body is mechanically coupled to the second rolling-element bearing ring and configured such that during rotation of the second rolling-element bearing ring the at least one porous body substantially rotates with the second rolling-element bearing ring, and, due to this rotation, releases an amount of the lubricant,
wherein the at least one porous body is further configured to absorb at least a portion of the released amount lubricant when the second rolling-element bearing ring is stationary, and
wherein the at least one porous body reduces a free bearing volume to at most 25% of a free comparison bearing volume which corresponds to the free bearing volume of the rolling-element bearing without the at least one porous body.

13. A rolling-element bearing comprising:
a first rolling-element bearing ring configured to be mechanically connectable to a stationary component;
a second rolling-element bearing ring configured to be mechanically connectable to a rotating component;
a lubricating space between the first rolling-element bearing ring and the second rolling-element bearing ring;
at least one porous body disposed between the first rolling-element bearing ring and the second rolling-element bearing ring in communication with the lubricating space, the at least one porous body being configured to take in liquid from the lubricating space; and
a sealing element between the first rolling-element bearing ring and the second rolling-element bearing ring, the sealing element being incapable of forming a static liquid seal,
wherein the at least one porous body is mechanically coupled to the second rolling-element bearing ring and is configured to rotate with the second rolling-element bearing ring and is configured to release the liquid taken in from the lubricating space back into the lubricating space in response to rotation of the second rolling-element bearing, and
wherein the at least one porous body is configured to absorb liquid from the lubricating space.

14. The rolling-element bearing according to claim 13, wherein a liquid retaining capacity of the at least one porous body exceeds a volume of the lubricating space.

15. The rolling-element bearing according to claim 13, wherein the lubricant is an oil and the at least one porous body comprises polyamide, polycarbonate, polystyrene, polyurethane or styrene-acrylonitrile copolymer.

16. The rolling-element bearing according to claim 13, wherein the lubricant is an oil and the at least one porous body comprises a sponge-like body of polyamide, polycarbonate, polystyrene, polyurethane or styrene-acrylonitrile copolymer.

17. A rolling-element bearing comprising:
a first rolling-element bearing ring configured to be mechanically connectable to a stationary component;
a second rolling-element bearing ring configured to be mechanically connectable to a rotating component;
a lubricating space between the first rolling-element bearing ring and the second rolling-element bearing ring; and
at least one porous body disposed between the first rolling-element bearing ring and the second rolling-element bearing ring in communication with the lubricating space, the at least one porous body being configured to take in liquid from the lubricating space,
wherein the at least one porous body is mechanically coupled to the second rolling-element bearing ring and is configured to rotate with the second rolling-element bearing ring and is configured to release the liquid taken in from the lubricating space back into the lubricating space in response to rotation of the second rolling-element bearing,
wherein the at least one porous body is configured to absorb liquid from the lubricating space, and
wherein a ratio of a volume of the lubricating space to a combined volume of the lubricating space and a volume of the at least one porous body is less than 25%.

* * * * *